United States Patent
Rabourn et al.

(10) Patent No.: US 6,377,675 B1
(45) Date of Patent: Apr. 23, 2002

(54) METHOD AND APPARATUS FOR EVEN DISTRIBUTION OF SIGNALING LINK SELECTION CODES

(75) Inventors: K Jeffrey Rabourn, Naperville; Charles Thomas Worlton, Bolingbrook; Wayne Kenneth Dalsing, Yorkville, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/365,930

(22) Filed: Aug. 2, 1999

(51) Int. Cl.[7] .................................................. H04M 7/00
(52) U.S. Cl. ....................... 379/230; 370/216; 370/410; 370/522; 379/221.04
(58) Field of Search .................................. 379/230, 229, 379/219, 220.01, 221.03, 221.04; 370/216, 225–228, 241–244, 410, 522

(56) References Cited

U.S. PATENT DOCUMENTS

| | | | |
|---|---|---|---|
| 5,029,165 A | * 7/1991 | Choi et al. | 370/410 |
| 5,084,816 A | * 1/1992 | Boese et al. | 714/4 |
| 5,592,530 A | * 1/1997 | Brockman et al. | 379/32.03 |
| 5,650,998 A | * 7/1997 | Angenot et al. | 370/225 |
| 5,845,069 A | * 12/1998 | Milne et al. | 379/426 |

* cited by examiner

Primary Examiner—Ahmad F. Matar
Assistant Examiner—Benny Q. Tieu
(74) Attorney, Agent, or Firm—Hill Law Firm LTD

(57) ABSTRACT

A method and apparatus for even SLS code distribution is provided. SLS codes are assigned to signaling links that connect signaling nodes in a telecommunications network. The SLS codes determine a physical link used for routing messages in the network. Each link has a nominal set of SLS codes, which provide for even SLS distribution when all links are available. When a link is unavailable, its nominal SLS codes are reassigned to an available link. When an unavailable link is restored, the nominal SLS codes for the restored link are allocated to the restored link (302). Then a determination is made of the desirable number of SLS codes each available link should have for even SLS distribution (303). Any links that have more than the desired number of SLS codes for even distribution have the number of SLS codes assigned to that link reduced by allocating the excess SLS codes to a buffer (305, 308). Then any available links that have less than the desirable number of SLS codes for even SLS distribution are allocated additional SLS codes from the buffer until each link has the desired number of SLS codes for even SLS distribution (310, 314). Once an equitable allocation is achieved, SLS codes are reassigned in accordance with the allocation.

14 Claims, 5 Drawing Sheets

| LINK | NORMAL SLS | | | |
|---|---|---|---|---|
| A | 00 | 08 | 16 | 24 |
| B | 01 | 09 | 17 | 25 |
| C | 02 | 10 | 18 | 26 |
| D | 03 | 11 | 19 | 27 |
| E | 04 | 12 | 20 | 28 |
| F | 05 | 13 | 21 | 29 |
| G | 06 | 14 | 22 | 30 |
| H | 07 | 15 | 23 | 31 |

| LINK | NORMAL SLS | | | | REASSIGNED SLS | | | |
|---|---|---|---|---|---|---|---|---|
| A | 00 | 08 | 16 | 24 | 04 | 05 | 06 | 12 |
| B | 01 | 09 | 17 | 25 | 07 | 13 | 14 | 20 |
| C | 02 | 10 | 18 | 26 | 15 | 21 | 22 | 28 |
| D | 03 | 11 | 19 | 27 | 23 | 29 | 30 | 31 |

| LINK | NORMAL SLS | | | | REASSIGNED SLS | | | |
|---|---|---|---|---|---|---|---|---|
| A | 00 | 08 | 16 | 24 | 05 | 06 | | |
| B | 01 | 09 | 17 | 25 | 07 | 13 | 14 | |
| C | 02 | 10 | 18 | 26 | 15 | 21 | 22 | |
| D | 03 | 11 | 19 | 27 | 23 | 29 | 30 | 31 |
| E | 04 | 12 | 20 | 28 | | | | |

| BUCKET | |
|---|---|
| 30 | 31 |

| LINK | NORMAL SLS | | | | REASSIGNED SLS | | |
|---|---|---|---|---|---|---|---|
| A | 00 | 08 | 16 | 24 | 05 | 06 | |
| B | 01 | 09 | 17 | 25 | 07 | 13 | 14 |
| C | 02 | 10 | 18 | 26 | 15 | 21 | 22 |
| D | 03 | 11 | 19 | 27 | 23 | 29 | |
| E | 04 | 12 | 20 | 28 | | | |

| LINK | NORMAL SLS | | | | REASSIGNED SLS | | |
|---|---|---|---|---|---|---|---|
| A | 00 | 08 | 16 | 24 | 05 | 06 | |
| B | 01 | 09 | 17 | 25 | 07 | 13 | 14 |
| C | 02 | 10 | 18 | 26 | 15 | 21 | 22 |
| D | 03 | 11 | 19 | 27 | 23 | 29 | |
| E | 04 | 12 | 20 | 28 | 30* | 31* | |

METHOD AND APPARATUS FOR EVEN DISTRIBUTION OF SIGNALING LINK SELECTION CODES

FIELD OF THE INVENTION

The present invention relates generally to telephone switching systems, and in particular, to a method and apparatus for evenly assigning signaling link selection codes to links connecting signaling nodes in a telecommunications network.

BACKGROUND OF THE INVENTION

Common Channel Signaling (CCS) No. 7 is a method for exchanging information between stored program control system nodes that are interconnected through a network of signaling links. As a part of the signaling network management of CCS No. 7, reconfiguration is accomplished by rerouting signaling traffic to bypass faulty links. Often it is necessary to activate and align new signaling links to restore the required signaling traffic capacity between two signaling points. When a faulty link is restored, traffic must be redistributed to take advantage of the restored capacity and avoid congestion.

In order to share traffic among a set of links to a destination, signaling link selection (SLS) codes are assigned to each link in the set. The messages traveling over the links are addressed to a destination using the SLS codes rather than physical link addresses as a measure of flexibility and to avoid fixed assignments of messages to faulty or unavailable links. The normal or nominal signaling link selection codes are assigned such that the load among the link set is even when all links are in service. When a link in the link set fails, the SLS codes assigned to that faulty link are distributed among the available links in the link set. When a faulty link is restored, it is desirable to reassign SLS codes in a manner such that the SLS codes are evenly distributed among the available links.

One prior system for reassigning SLS codes after restoring a faulty link merely reassigns to the restored link the nominal SLS codes assigned to that link. Unfortunately, this fails to consider the load among the available links and does not provide even SLS distribution. For example, assume there are three available links designated A, B, and C and each link has 12 SLS codes normally assigned to it when all the links are available. A fault occurs in link A and link B, causing all 36 SLS codes to be distributed to link C. Then link B is restored to service, but link A remains unavailable. Under this prior system, link B is reassigned its 12 nominal SLS codes, while link C has 24 SLS codes assigned to it. Obviously, the SLS codes are not distributed equally in this scenario, potentially causing traffic congestion problems.

Another prior system reassigns SLS codes to a link set after restoration of a faulty link by first reassigning the nominal SLS codes to the restored link and then attempting in a single iteration to balance the load. More specifically, in this prior system, after the nominal SLS codes are reassigned to the newly restored link, a determination is made of the number of SLS codes each active link would be expected to carry if SLS codes were evenly distributed. Then each active link is examined to determine if the link has more than the "expected" number of SLS codes and if so, whether any of the SLS codes are not nominally assigned to that link. If a link has more than the "expected" number of SLS codes and some of the SLS codes of that link are not nominally assigned to that link, then the non-nominal SLS codes of that link are assigned to the newly restored link, until the newly restored link has the "expected" number of links. No attempt is made to reassign SLS codes to links other than the newly restored link. This method of reassigning SLS codes produces acceptable results but does not always produce even SLS code distribution. Observation of this prior method indicates that even SLS distribution is obtained about 75% of the time, where even distribution means each link in a link set has the same number of SLS codes or the difference in the number of SLS codes between any two links is no more than one.

The major drawback with prior methods and systems for SLS distribution is that even SLS distribution is not always achieved. In addition, because of the cost associated with actual reassignment of SLS codes to links, an iterative process that requires movement of an SLS code more than once is undesirable. Also, some prior methods and systems for SLS code distribution employ non-linear sorting algorithms, which are inefficient for large link sets with many SLS codes.

Therefore, a need exists for a method and apparatus for achieving even SLS distribution with a minimal number of actual SLS reassignments.

SUMMARY OF THE INVENTION

In accordance with one aspect of the present invention, a method of assigning signaling link selection (SLS) codes to a link in a link set is provided. A nominal or normal signaling link selection code assignment initially determines which signaling link selection codes are assigned to a link in a link set. The nominal signaling link selection codes are assigned to provide an even distribution of traffic over all the links in a link set. When a link in the link set becomes unavailable, the SLS codes assigned to that link are reassigned to other available links in the link set. When a link in a link set is restored to service and available to service traffic, the signaling link selection codes are reassigned to take advantage of the additional capacity.

First, the nominal signaling link selection codes associated with the restored link are allocated to the restored link. Then a determination is made of the minimum number of SLS codes that should be assigned to each available link in the link set. Preferably, the minimum number of SLS codes is determined by dividing the total number of SLS codes by the total number of available links, where the minimum number of SLS codes is the integer or whole number portion of the quotient from the division. Next a determination is made of the remaining number of SLS codes that would be unassigned if each available link had the minimum number of SLS codes assigned to it. This is the remainder from the division of the total number of SLS codes by the total number of available links.

After the minimum number of SLS codes and the remaining number of SLS codes is determined, each available link of the link set is examined to determine whether the number of SLS codes assigned to that link is acceptable to provide even SLS distribution. First each available link of the link set is examined to determine whether the available link has more than an acceptable number of signaling link selection codes assigned. The acceptable number of signaling link selection codes is equal to the minimum number of signaling link selection codes, except that a number of available links that is equal to the remaining number of signaling link selection codes will have the minimum number of signaling link selection codes plus an additional signaling link selection code. In other words, the remaining number of signaling link selection codes reflects the number of available links that will have one more than the minimum number of signaling link selection codes assigned to achieve even SLS distribution.

Any available link that has more than the acceptable number of signaling link selection codes assigned is designated as an over-a-maximum link. For each over-a-maximum link, the number of signaling link selection codes that must be reassigned to reduce the number of assigned SLS codes to equal the acceptable number of SLS codes are allocated to a buffer. After each over-a-maximum link is examined and the signaling link selection codes are allocated to the buffer, no available links will have more than an acceptable number of signaling link selection codes allocated to it. However, at this stage, some available links may have less than the acceptable number of signaling link selection codes allocated to them.

For each available link that has less than the acceptable number of signaling link selection codes allocated, signaling link selection codes from the buffer are allocated to this minimum link until the minimum link has the acceptable number of signaling link selection codes assigned. After the signaling link selection codes have been allocated such that each available link has the acceptable number of signaling link selection codes, the signaling link selection codes are assigned to the available links. After this assignment, each available link in the link set has the SLS codes evenly distributed.

An apparatus in accordance with the invention includes a plurality of trunks for communication, a processor coupled to the plurality of trunks to associate a link set with at least some of the plurality of trunks, and a memory storing signaling link selection codes that are assigned to each link of the link set. The processor assigns SLS codes to links of the link set in accordance with the method described above.

BRIEF DESCRIPTION OF THE DRAWINGS

FIGS. 4 A–4F are tables illustrating an example of SLS assignments In accordance with the present invention.

DETAILED DESCRIPTION OF THE PREFERRED EMBODIMENTS

Figure 1:
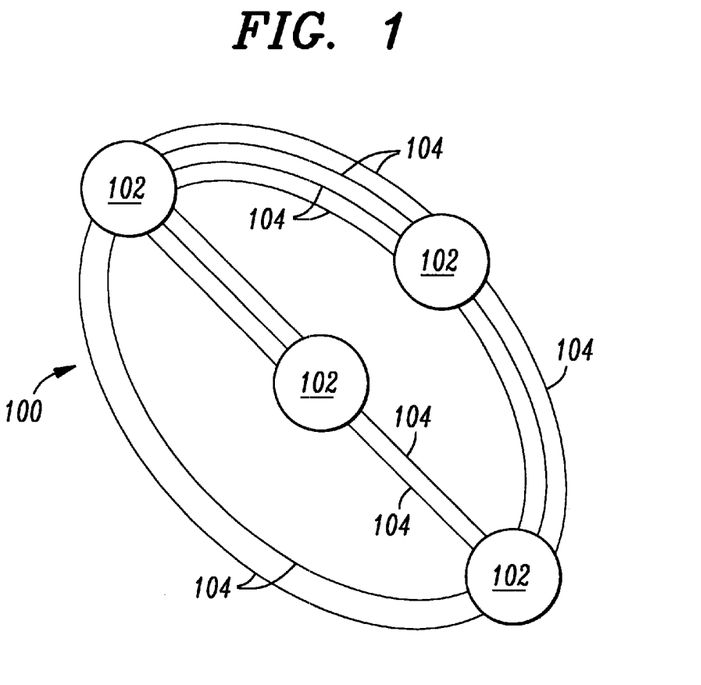
FIG. 1 is a schematic diagram of a telecommunications network including signaling nodes, which assign signaling link selection codes in accordance with the present invention.

FIG. 1 is a schematic diagram of a telecommunications network 100. Telecommunications network 100 includes signaling nodes 102 and signaling links 104. Messages are routed between signaling nodes 102 via signaling links 104. In a preferred embodiment, telecommunications network 100 is a common channel signaling (CCS) network for exchanging information between stored program control systems. Signaling nodes 102 are alternatively, switching systems, network databases or operator services systems. Signaling links 104 are preferably digital bi-directional transmission facilities or trunks.

Signaling nodes 102 communicate with each other via signaling links 104 through a layered protocol. The protocol extends from a physical layer to higher layers, which are useable without regard to the lower level and physical protocol for transmission. In a multi-level protocol, multiple physical links, all of which are capable of connecting a source node with a desired destination node, are grouped together into a link set. To facilitate the transmission of messages over signaling links, without regard to the actual physical link used, signaling link selection codes are used in higher level protocols to designate a transmission from one signaling node to another signaling node. The SLS codes are assigned to particular physical links, based on the availability of the links. By virtue of this level of indirection, transmission facilities designated by SLS codes are available without regard to the availability of a certain actual physical link.

Figure 2:
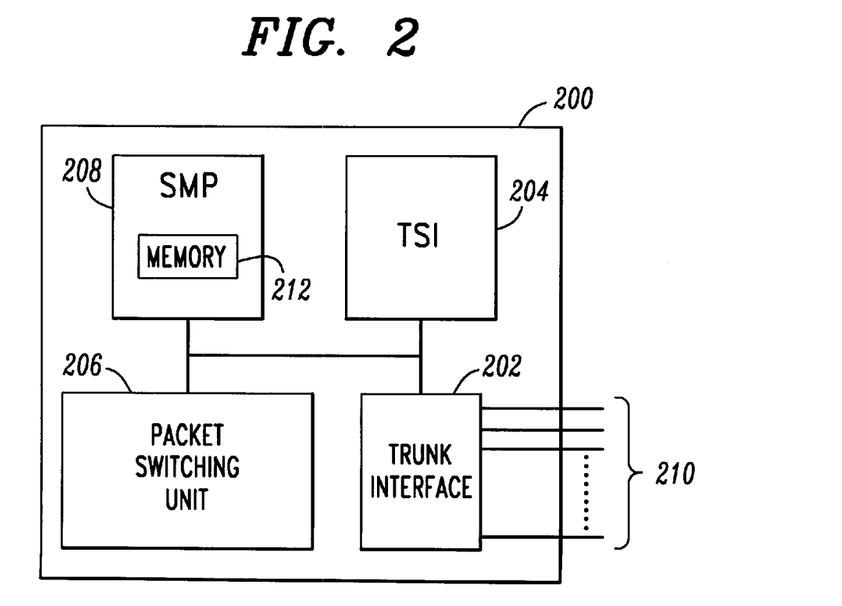
FIG. 2 is a block diagram of a preferred embodiment of a switching module of a signaling node in accordance with the present invention.

FIG. 2 shows a block diagram of switching module 200 in accordance with the present invention. Switching module 200, among other functions, provides the physical interface for the signaling data links 104 and also implements the higher level protocols and the protocol for assigning SLS codes to the signaling data links 104. In a preferred embodiment, switching module 200 includes a trunk interface unit 202, a time slot interchange unit 204, a packet switching unit 206 and a switching module processor 208.

Trunk interface unit 202 interfaces a plurality of trunks 210 with the switching module 200. Trunks 210 provide the physical connection for signaling data links 104. Time slot interchange unit 204 facilitates multiplexing and demultiplexing the data streams associated with trunks 210. Packet switching unit 206 executes a protocol for the higher layers associated with the CCS number 7 protocol. Switching module processor 208, which includes memory 212, executes the algorithm for assigning SLS codes to signaling data links in accordance with the invention.

Figure 3A:
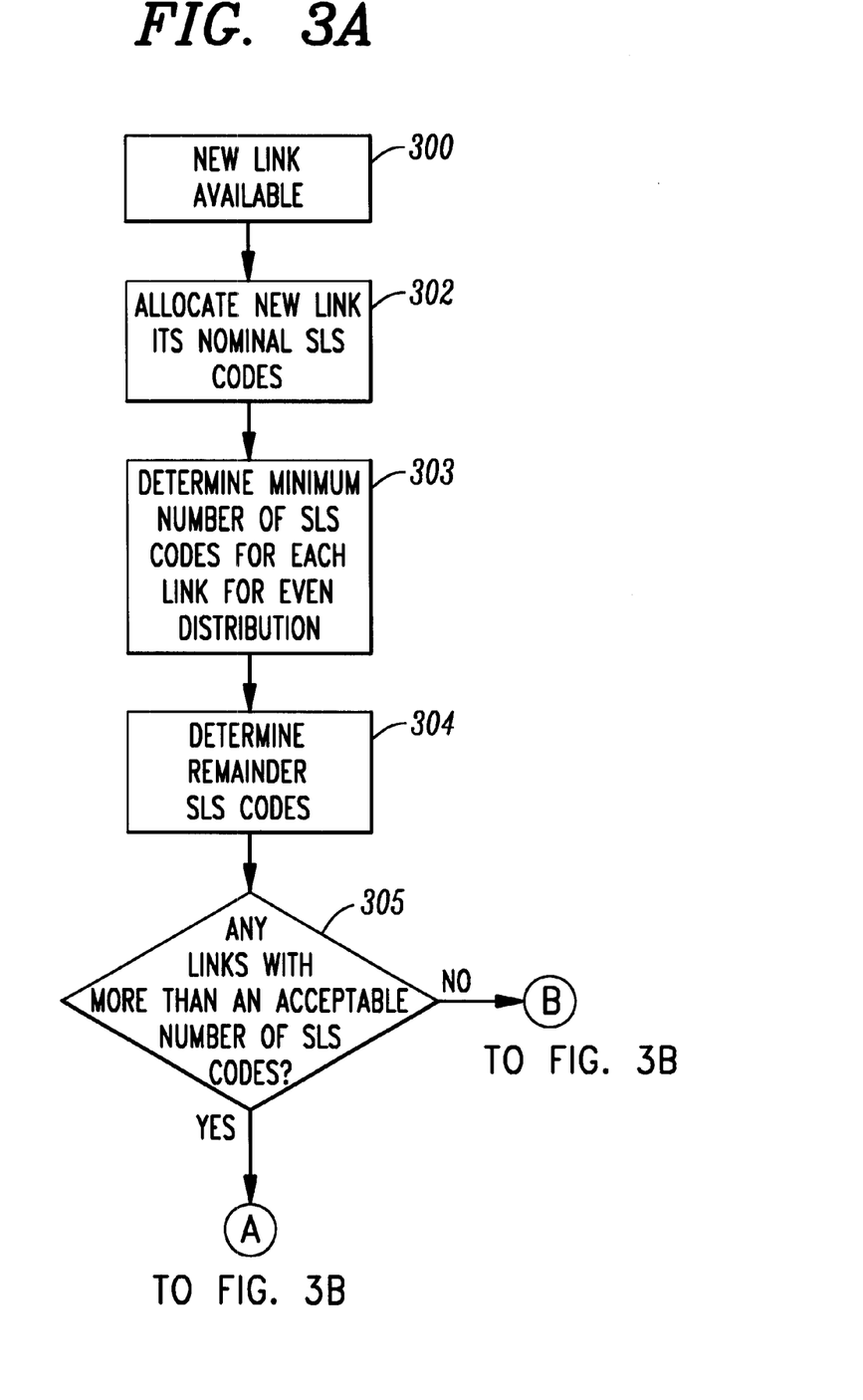
FIGS. 3A–3B are a flow chart illustrating a method for assigning signaling link selection codes in accordance with the present invention.
Figure 3B:
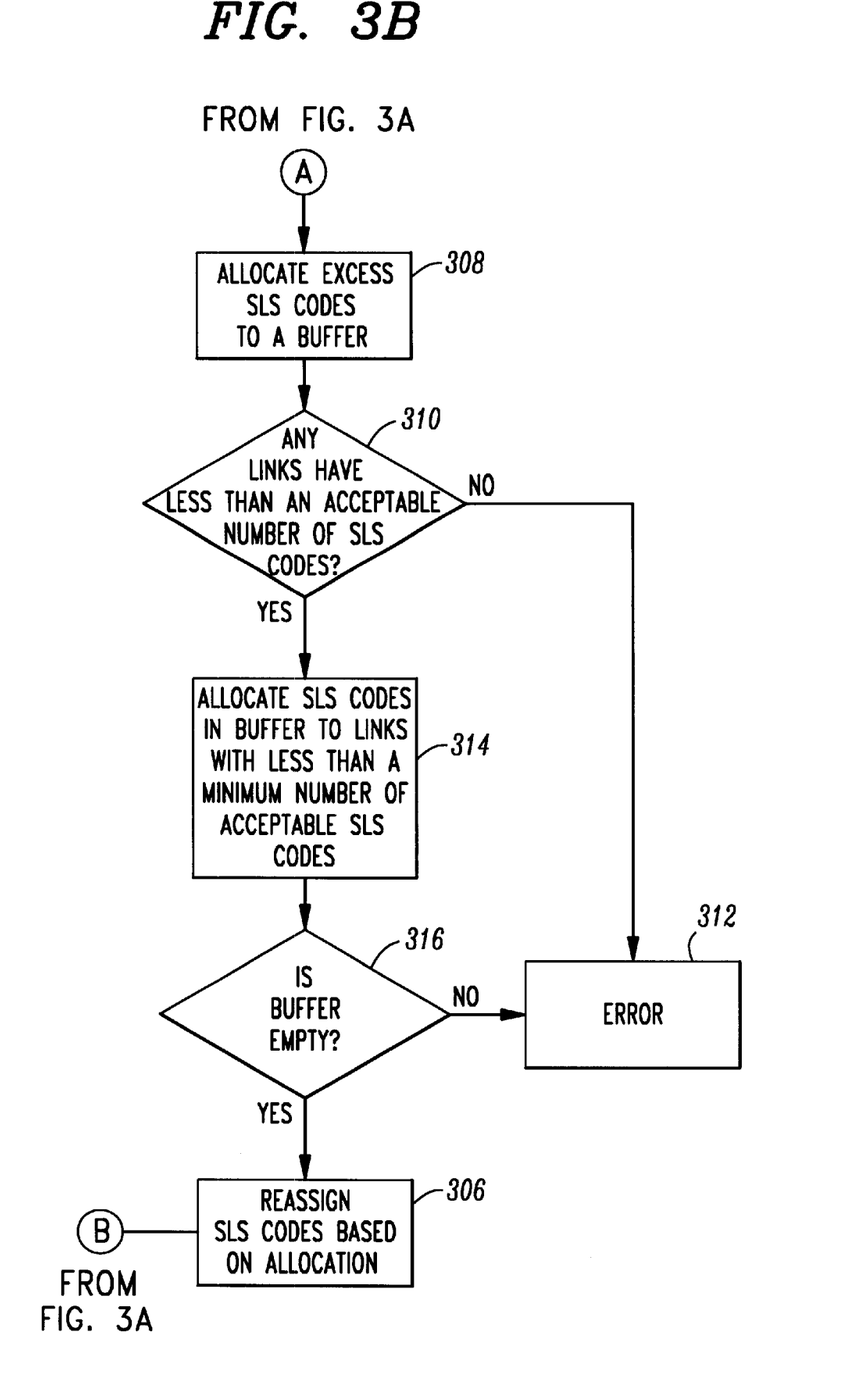

FIGS. 3A–B are a flow chart illustrating a method for allocating SLS codes in accordance with the present invention. The method is executed when a new link becomes available in a link set (300). Typically, a new link becomes available when it is restored to service. The nominal SLS codes are assigned such that generally, when all links are available, each link has the nominal SLS codes assigned to it. Therefore, when a new link first becomes available, the nominal SLS codes for that link are assigned to other links.

As a first step in reassigning SLS codes to account for the new or restored link, the SLS codes nominally assigned to that link are allocated to that link (302). This inherently entails unallocating or removing the nominal SLS codes for the restored link from another available link. The allocation of SLS codes to achieve an even distribution preferably uses temporary storage for the allocation and removal of SLS codes prior to actual reassignment of SLS coded to links.

Next a determination is made of the minimum number of SLS codes that should be assigned to each available link to achieve even SLS distribution (303). This number is determined by dividing the total number of SLS codes for the link set by the number of available links for the link set. Only the whole number portion of the answer is the minimum number of SLS codes. Any remainder from the division of the total number of SLS codes for the link set by the number of available links is retained as the remainder number of SLS codes (304).

Since SLS codes cannot be separated into fractional parts, an even SLS distribution may require that some links have one more SLS code assigned than some other link. However, with an even SLS distribution, the difference in the number of assigned SLS codes should not vary by more than one for any two links. The integer or whole number portion of the quotient determined by dividing the total number of SLS codes for the link set by the number of available links reflects the minimum number of SLS codes that any available link should have. The remainder number of SLS codes indicates how many links will have one more than the minimum number of SLS codes. For example, if there are 55 SLS codes and 16 available links, then in a system with even SLS code distribution, there will be 3 SLS codes at least, for the 16 available links and 7 links will have 4 SLS codes. In other words, even SLS distribution requires that 9 links have 3 SLS codes assigned and 7 links have 4 SLS codes assigned. This results from the division of 55 by 16, which produces a whole number quotient of 3, the minimum number of SLS codes per link, and a remainder of 7, the number of links with one more than the minimum number of SLS codes.

Next, each link is examined to determine whether any link has more than an acceptable number of SLS codes allocated to it (305). This requires checking to see that (i) only a remainder number of the available links have more than the minimum number of SLS codes plus 1; and (ii) all other available links have the minimum number of SLS codes. If no links have more than an acceptable number of SLS codes, then the SLS codes are reassigned based on the present allocation (306) and even SLS distribution is obtained.

If there are available links that have more than an acceptable number of SLS codes, then each link that has more than the acceptable number of SLS codes must have SLS codes unallocated from the link and allocated to a buffer or bucket for temporary storage (308). Then the links with less than an acceptable number of SLS codes are identified (310). If there are no links that have less than an acceptable number of SLS codes, then there is an error (312), and corrective action is necessary.

Once the links having less than the acceptable number of SLS codes are identified (310), then the excess SLS codes in the buffer are allocated to the links having less than the acceptable number of SLS codes (314). This entails allocating to each link that has less than the acceptable number of SLS codes, a number of SLS codes until the link has the acceptable number of SLS codes. As discussed above, determining whether a link has the acceptable number of SLS codes requires accounting for the number of links that will have the minimum number of SLS codes plus 1 in an even SLS distribution.

In a preferred embodiment of allocating SLS codes up to the acceptable number of SLS codes per link, a remainder flag equal to the remainder number of SLS codes is set in step 304 and the acceptable number of SLS codes is set as the minimum number of SLS codes plus one, if the remainder flag is greater than zero. Then for each link that is examined in step 305, the remainder flag is decremented by one for each link that has at least the acceptable number of SLS codes. Then the acceptable number of SLS codes is changed to equal the minimum number of SLS codes when the remainder is zero or if the remainder flag is initially set to zero. Thus, after the remainder is zero, the remaining links examined are compared against the minimum number of SLS codes, rather than the minimum number of SLS codes plus 1. The value of the remainder flag and the acceptable number of SLS codes are preserved from the determination made in steps 305, 308 and used in step 310. As excess SLS codes are allocated from the buffer (314), each link that has less than the acceptable number of SLS codes is allocated SLS codes from the buffer until the number of SLS codes allocated to that link equals the acceptable number of SLS codes. The remainder flag is decremented by one each time a link is allocated SLS codes such that the number of SLS codes allocated equals a minimum number of SLS codes plus 1. After the remainder flag is zero, the acceptable number of SLS codes is set equal to the minimum number of SLS codes. By use of a reminder flag, management of the allocation of SLS codes to achieve an even SLS distribution is accomplished.

L After all the SLS codes in the buffer are allocated (314) and each link is examined (310), a check is made to ensure the buffer is empty (316). Of course, if the buffer is not empty, there is an error (312). Otherwise, based on the allocations made previously, the SLS codes are reassigned to the links in the final step (306). Alternatively, SLS codes may be assigned at the point of allocation throughout the method described above.

Figure 4A:
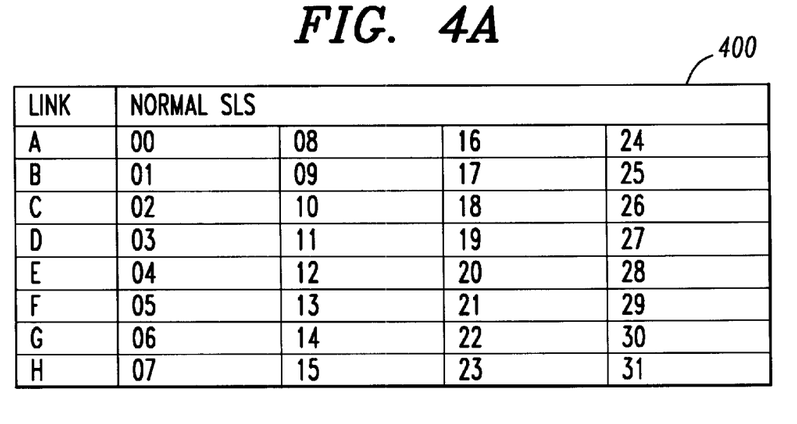

FIGS. 4A–4F are tables showing SLS code assignments to links in a link set. The tables illustrate a method in accordance with the invention, as discussed below. In FIG. 4A table 400 illustrates a link set, which nominally has 8 links labeled A–H. There are 32 SLS codes assigned to the 8 links. Table 400 shows the normal or nominal SLS code assignment with the SLS codes assigned to a link in the same row as the link label. For example, link A has assigned as nominal SLS codes 00, 08, 16 and 24. As shown in table 400 the nominal SLS codes provide an even SLS distribution of 4SLS codes per link.

Figure 4B:
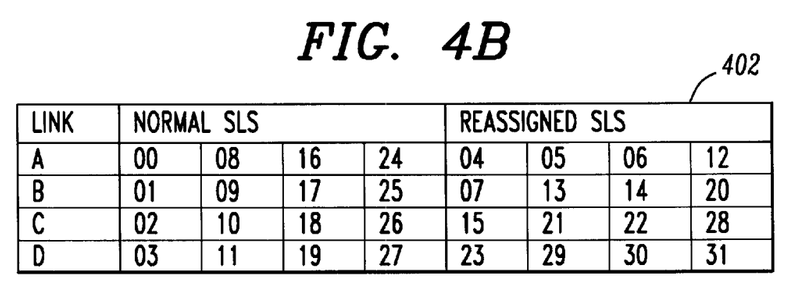

In FIG. 4B, table 402 shows an assignment of SLS codes for available links A–D. Table 402 assumes that links E–H are unavailable. Therefore, the SLS codes nominally assigned to links E–H are shown assigned to links A–D and are labeled "reassigned SLS." The SLS code assignment of table 402 has an even SLS distribution of 8 SLS codes for each of the four available links.

FIGS. 4C–4F illustrate even SLS code distribution in accordance with the present invention. In this example, link E is restored for the link set composed of links A–H following the assignment of SLS codes shown in table 402. First, according to step 302, link E is allocated its nominal SLS codes. This allocation is reflected in table 403, which shows SLS codes 04, 12, 20 and 28 allocated to link E. Note that SLS codes 04, 12, 20 and 28 are nominally assigned to link E, as shown in table 400. At this point, the SLS codes are not evenly distributed. More specifically, link A has 6 SLS codes; link B has 7 SLS codes; link C has 7 SLS codes; link D has 8 SLS codes; and link E has 4 SLS codes.

Figure 4C:
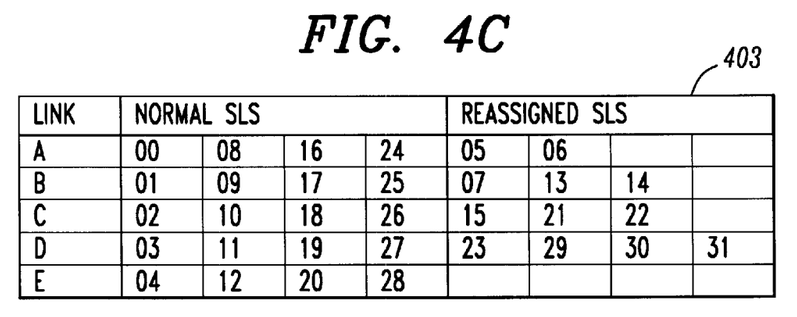
Figure 4D:
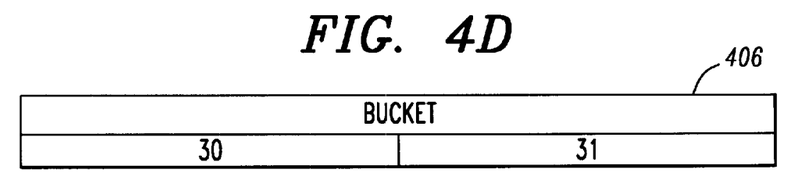

In accordance with step 303, the number of SLS codes that should be distributed to each available link for even SLS distribution is determined. In this example, the total number of SLS codes for the link set equals 32 and the total number of available links equals 5, links A–E. This yields 32 divided by 5, which equals 6, the minimum number of SLS codes, and a remainder of two. Therefore, for even SLS distribution in this example, 3 links should have 6 SLS codes assigned and two links should have 7 SLS codes assigned.

According to steps 305 and 308, a determination is made of whether any of the available links has more than an acceptable number of SLS codes and excess SLS codes are allocated to a buffer. According to the preferred embodiment, the acceptable number of SLS codes is set at 7 initially and the remainder flag is set at 2. A review of each link in the link set reveals which links have more than the acceptable number of SLS codes. Link A has 6 SLS codes, which is less than 7, the acceptable number of SLS codes. Therefore, no excess SLS codes are removed or unallocated from link A. Link B has 7 SLS codes assigned, which is equal to the acceptable number of SLS codes. Since link B has the acceptable number of SLS codes, the remainder flag is decremented by 1. Since the remainder is not equal to zero after decrementing, the acceptable number of SLS codes remains at 7, the minimum number of SLS codes plus one. Link C also has 7 SLS codes assigned, which is equal to the acceptable number of SLS codes. Since link C has the acceptable number of SLS codes, the remainder flag is reduced by 1, making the remainder flag equal zero. Since, the remainder flag is zero, the acceptable number of SLS codes is reduced to 6, the minimum number of SLS codes. Link D has 8 SLS codes assigned which is greater than 6, the acceptable number of SLS codes, by 2 SLS codes. Hence, 2 SLS codes from link D are allocated to a bucket or buffer, shown in table 406. Link E has 4 SLS codes, which is less than 6, the acceptable number of SLS codes. Therefore, no excess SLS codes are available for allocation to the buffer. Tables 408 (FIG. 4E) and 406 (FIG. 4D) show the allocation of SLS codes to links and the buffer after steps 305, 308.

Figure 4E:
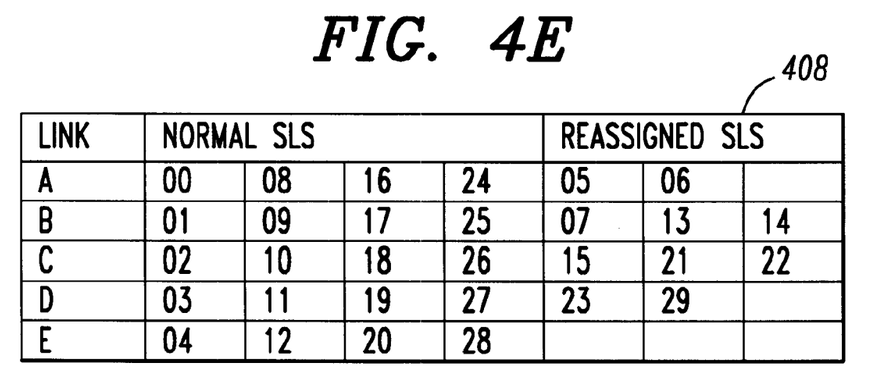

According to step 310, each link is examined to determine which links have less than the acceptable number of SLS codes. By virtue of the preferred method described above, the acceptable number of SLS codes is preserved from step 305 and equals 6 in this example. The remainder flag, which is also preserved, is equal to 0. Taking each link in turn, link A has 6 SLS codes assigned in table 408. Since the acceptable number of SLS codes equals 6 and link A has 6 SLS codes, link A does not have less than the acceptable number of SLS codes. Links B and C each have 7 SLS codes, which is not less than the acceptable number of SLS codes. Link D has 6 SLS codes allocated to it. Since 6 is not less than the acceptable number of SLS codes, no additional SLS codes are needed for link D. Link E, however, has only 4 SLS codes, which is less than the acceptable number of SLS codes, in this example 6. Therefore, link E must be allocated SLS codes from the buffer in accordance with step 314. Link E is allocated additional SLS codes until it has the acceptable number of SLS codes. In order to bring the number of SLS codes allocated to link C up to 6, the two SLS codes, 30, 31 are removed from the buffer and allocated to link E. The resulting allocation is shown in table 410 of FIG. 4F.

Figure 4F:
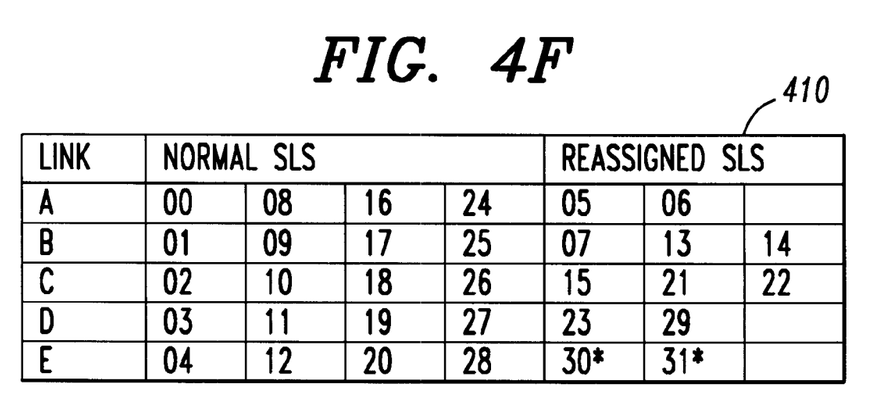

A check is made to determine whether the buffer is empty in accordance with step 316. In this case, since the buffer is empty, the allocated SLS codes are actually assigned as shown in table 410.

Even SLS code distribution is achieved by the present invention. According to a preferred embodiment of the invention, even SLS code distribution is achieved with a linear algorithm, avoiding costly sorting. The SLS codes are merely virtual representations of physical links between nodes in a network. Though the preferred embodiment relates to telephone switching systems, the invention is applicable to any network employing virtual representations of physical links or paths, where the virtual representations are assigned to physical paths.

The invention being thus described, it will be evident that the same may be varied in many ways. Such variations are not to be regarded as a departure from the spirit and scope of the invention and all such modifications are intended to be included within the scope of the appended claims.

What is claimed is:

1. A method for assigning signaling link selection codes to a link connecting signaling nodes in a network, the method comprising the steps of:

A) allocating nominal signaling link selection codes to a restored link in a link set;

B) determining a minimum number of signaling link selection codes for each available link of the link set;

C) determining a remaining number of signaling link selection codes that will be unassigned when each available link has the minimum number of signaling link selection codes;

D) for each available link of the link set, determining whether the each available link has more than an acceptable number of signaling link selection codes assigned, where the each available link that has more than the acceptable number of signaling link selection codes is an over-a-maximum link;

E) for each over-a-maximum link, allocating to a buffer a number of signaling link selection codes that reduces the number of signaling selections assigned to the each over-a-maximum link to equal the acceptable number of signaling link selection codes;

F) for each available link of the link set, determining whether the each available link has less than an acceptable number of signaling link selection codes assigned, where the each available link that has less than the acceptable number of signaling link selection codes is an under a minimum link; and G) for each under a minimum link, allocating signaling link selection codes from the buffer to the each under a minimum link until the each under a minimum link has the acceptable number of signaling link selection codes, thereby producing a final allocation of signaling link selection codes.

2. The method of claim 1 further comprising the step of:

H) reassigning signaling link selection codes in accordance with the final allocation.

3. The method of claim 1 wherein signaling link selection codes are reassigned at a time of allocation.

4. The method of claim 1 wherein the acceptable number of signaling link selection codes is equal to the minimum number of signaling link selection codes plus one for a first number of links equal to the remaining number of signaling link selection codes, and the acceptable number of signaling link selections is equal to the minimum number of signaling link selection codes for a second number of links equal to a total number of available links in the link set minus the first number of links.

5. The method of claim 1 wherein steps B and C further comprise the steps of:

B1) dividing a total number of signaling link selection codes for the link set by a total number of available links in the link set to produce an integer quotient and a remainder;

B2) setting the integer quotient equal to the minimum number of signaling link selections for each available link of the link set; and C1) setting the remainder equal to the remaining number of signaling link selection codes that will be unassigned when each available link has the minimum number of signaling link selection codes.

6. The method of claim 5 wherein the acceptable number of signaling link selection codes is equal to the integer quotient plus one for a first number of links equal to the remainder, and the acceptable number of signaling link selections is equal to the integer quotient for a second number of links equal to a total number of available links in the link set minus the first number of links.

7. The method of claim 5 wherein the acceptable number of signaling link selections is determined by the steps of:

if the remainder is greater than zero, setting the acceptable number of signaling link selections equal to the minimum number of signaling link selection codes plus one;

if the remainder is greater than zero, for each available link of the link set, decrementing the remainder by one for each available link of the link set that has the acceptable number of signaling link selection codes; and if the remainder equals zero, setting the acceptable number of signaling link selection codes equal to the minimum number of signaling link selection codes.

8. An telephone switching apparatus comprising:

a plurality of trunks for communication;

a processor coupled to the plurality of trunks to associate a link set with the plurality of trunks;

a memory storing a plurality of signaling link selection codes that are associated with each link of the link set, the memory being operably coupled to the processor;

wherein when a link is restored to service in a link set to produce a restored link, the processor:

allocates nominal signaling link selection codes to the restored link;

determines a minimum number of signaling link selection codes for each available link of the link set;

determines a remaining number of signaling link selection codes that will be unassigned when each available link has the minimum number of signaling link selection codes;

determines, for each available link of the link set, whether the each available link has more than an acceptable number of signaling link selection codes assigned, where the each available link that has more than the acceptable number of signaling link selection codes is an over-a-maximum link;

for each over-a-maximum link, allocates to a buffer a number of signaling link selection codes that reduces the number of signaling selections assigned to the each over-a-maximum link to equal the acceptable number of signaling link selection codes;

for each available link of the link set, determines whether the each available link has less than an acceptable number of signaling link selection codes assigned, where the each available link that has less than the acceptable number of signaling link selection codes is an under a minimum link; and     for each under a minimum link, allocates signaling link selection codes from the buffer to the each under a minimum link until the each under a minimum link has the acceptable number of signaling link selection codes, thereby producing a final allocation of signaling link selection codes.

9. The apparatus of claim 8 wherein the processor reassigns signaling link selection codes in accordance with the final allocation.

10. The apparatus of claim 8 wherein the processor reassigns signaling link selections at a point of allocation.

11. The apparatus of claim 8 wherein the acceptable number of signaling link selection codes is equal to the minimum number of signaling link selection codes plus one for a first number of links equal to the remaining number of signaling link selection codes, and the acceptable number of signaling link selections is equal to the minimum number of signaling link selection codes for a second number of links equal to a total number of available links in the link set minus the first number of links.

12. The apparatus of claim 8 wherein the processor:

divides a total number of signaling link selection codes for the link set by a total number of available links in the link set to produce an integer quotient and a remainder;

sets the integer quotient equal to the minimum number of signaling link selection codes for each available link of the link set; and     sets the remainder equal to the remaining number of signaling link selection codes that will be unassigned when each available link has the minimum number of signaling link selection codes.

13. The apparatus of claim 12 wherein the acceptable number of signaling link selection codes is equal to the integer quotient plus one for a first number of links equal to the remainder, and the acceptable number of signaling link selections is equal to the integer quotient for a second number of links equal to a total number of available links in the link set minus the first number of links.

14. The apparatus of claim 12 wherein the acceptable number of signaling link selections is determined by:

if the remainder is greater than zero, setting the acceptable number of signaling link selections equal to the minimum number of signaling link selection codes plus one;

if the remainder is greater than zero, for each available link of the link set, decrementing the remainder by one for each available link of the link set that has the acceptable number of signaling link selection codes; and     if the remainder equals zero, setting the acceptable number of signaling link selection codes equal to the minimum number of signaling link selection codes.

\* \* \* \* \*